United States Patent [19]

Krauss et al.

[11] 4,181,947
[45] Jan. 1, 1980

[54] CONVEYOR SORTING SYSTEM

[75] Inventors: Dale A. Krauss; Robin L. Chang, both of Grand Rapids, Mich.

[73] Assignee: Rapistan, Incorporated, Grand Rapids, Mich.

[21] Appl. No.: 908,999

[22] Filed: May 23, 1978

[51] Int. Cl.² .................. G06F 15/20; B65G 43/00
[52] U.S. Cl. ................................. 364/478; 198/349; 209/942; 364/120; 364/900; 414/134
[58] Field of Search ............ 364/478, 479, 120, 552, 364/200 MS File, 900 MS File; 198/349, 356; 209/942, 546, 547, 552, 564, 604; 214/11 R, 11 C

[56] References Cited

U.S. PATENT DOCUMENTS

| | | | |
|---|---|---|---|
| 3,252,596 | 5/1966 | Beecher et al. | 364/479 X |
| 3,725,867 | 4/1973 | Jordan | 364/900 |
| 3,803,556 | 4/1974 | Duffy | 364/900 |
| 3,868,643 | 2/1975 | Bullivant | 364/900 |
| 3,880,298 | 4/1975 | Habegger et al. | 214/11 R |
| 3,895,716 | 7/1975 | Ugo | 364/900 X |

Primary Examiner—Joseph F. Ruggiero

Attorney, Agent, or Firm—Price, Heneveld, Huizenga & Cooper

[57] ABSTRACT

A high speed conveyor sorting system includes a plurality of infeed conveyors coupled to an induction station including a merging conveyor for singulating articles from the infeed conveyor and inducting them onto a sorting conveyor. An operator actuated control system is employed for controlling the release mechanism of the induction station and diverters spaced along the sorting conveyor for discharging articles from the sorting conveyor onto preselected diverting conveyors spaced longitudinally along the sorting conveyor. The control system includes a portable training detector which is movably positioned near each of the divert locations such that the travel of an article from a predetermined reference point detector near the induction station to each of the divert locations can be accurately ascertained by counting pulses from a pulse position indicator associated with the conveyor during the travel interval of the article. Such information is stored in memory means of the control system and subsequently employed for the actuation of a diverter at preselected divert locations to effect accurate discharge of articles from the sorting conveyor to divert conveyors at the selected divert locations.

28 Claims, 5 Drawing Figures

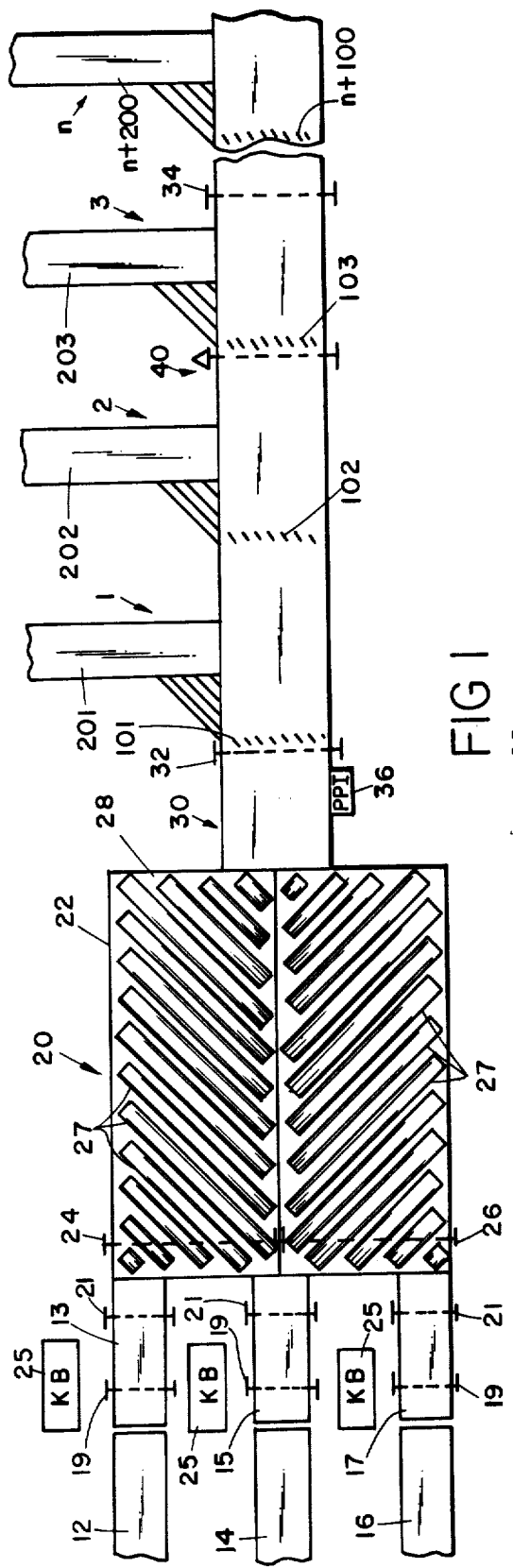
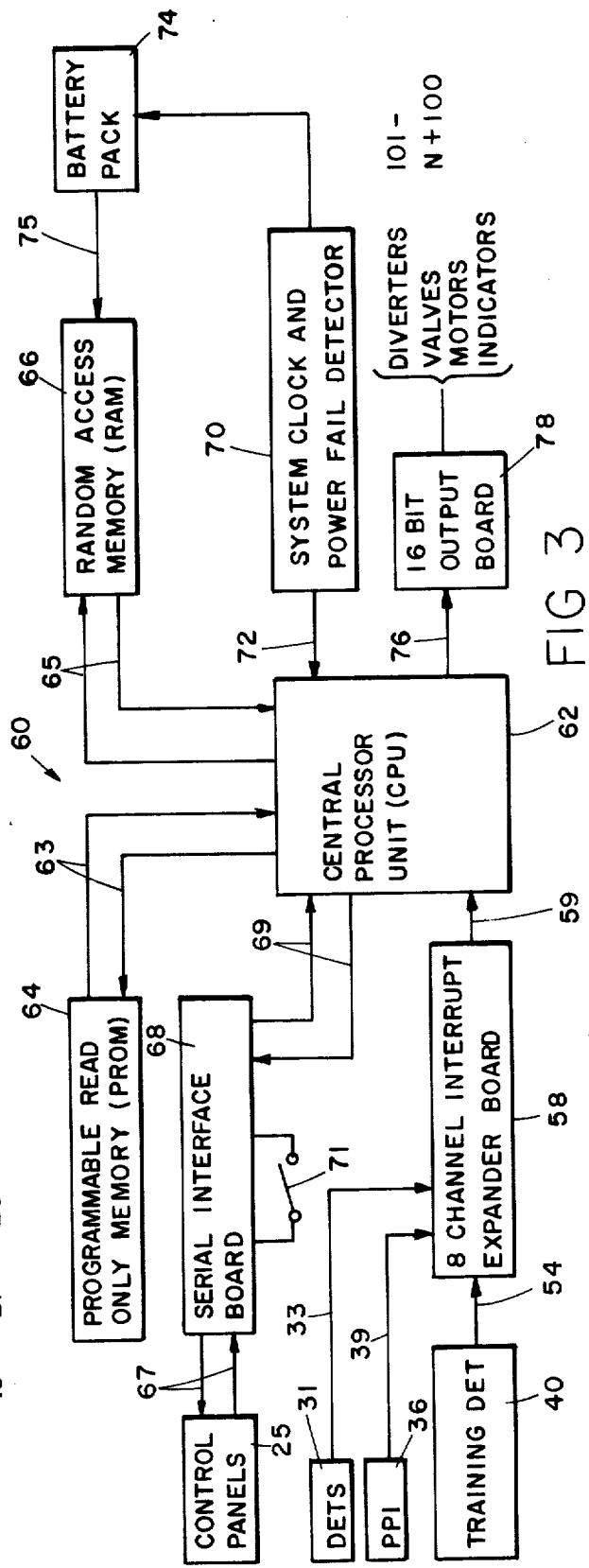

CONVEYOR SORTING SYSTEM

BACKGROUND OF THE INVENTION

The present invention relates to sorting conveyors and particularly to an improved control system therefore.

In conveyor sorting systems of the type disclosed, for example, in U.S. Pat. No. 4,044,897, issued to W. R. Maxted, on Aug. 30, 1977, and assigned to the present assignee, in order to initially set the system up for the proper diverting of articles onto the divert conveyors, it is necessary to physically measure the distance from a reference point such as a photocell at the induction station to each divert location. This information is then used in programming the central controller used in such systems. Typically, this approach requires significant trial and error and cannot accommodate for slippage of articles traveling along the conveyor or for conveyors with sections moving at different speeds. Also, when articles with different shapes, sizes, and weights are being transported, the conveyor will in many cases transport the articles at different speeds and thus the measured distance will not always provide information which can successfully be employed to assure articles will be diverted at the assigned divert location.

In computer control systems, typically programmable read only memories (PROMs) are employed. Thus, when the measured distance information does not operate the system successfully, it is necessary to remove the PROM and reprogram it until optimum parameter values can be established. This empirical approach is very time consuming, costly, and frequently can shut down a conveyor system for several days.

In order to overcome the difficulties of the prior art, the present invention encompasses the utilization of a portable training detector which is employed in conjunction with the control system to provide electrical signals representative of the travel of an article from a predetermined location near the induction station to each of the divert locations. These electrical signals are stored in a memory system which can be a temporary memory during the initial installation of the system and once the optimum parameters are ascertained by running different size and shaped articles through the system, the optimum parameter values can be transferred to a permanent memory for subsequent use of the system.

By employing a training detector which is portable, can physically be movably positioned to the divert locations, therefore, electrical signals from, for example, a pulse position indicator (PPI) can be counted and the resultant data used directly without physical measurement and conversion being required. This data accurately represents the motion of an article from a predetermined location to each of the divert locations and is the same data which is subsequently employed in the system to control the diverting of articles. Such an arrangement greatly simplifies the initial setup and subsequent accuracy of operation of the system overcoming the trail and error inaccuracies of the prior art and accommodates for variables due to the article's size, shape, and weight variations as well as conveyor speed variations normally encountered.

SUMMARY OF THE INVENTION

Systems embodying the present invention include at least one infeed conveyor coupled by means of an induction station to a sorting conveyor with a plurality of divert locations spaced therealong. Each of the divert locations include an actuatable divert means for diverting articles from the sorting conveyor to a selected divert conveyor located at each of the divert locations. An operator actuated control system is included for controlling the divert means to sort articles according to an assigned divert location. The control system includes means for determining the travel of articles from a predetermined location to each of the divert locations and for storing such information for subsequent correlation with the assigned divert location information for an article to discharge an article from the sorting conveyor to divert conveyors at selected divert locations.

BRIEF DESCRIPTION OF THE DRAWINGS

FIG. 1 is a plan schematic view of a sorting conveyor system embodying the present invention;

FIG. 3 is an electrical circuit diagram in block form of the control system for the present invention;

DETAILED DESCRIPTION OF THE PREFERRED EMBODIMENT

Figure 2:
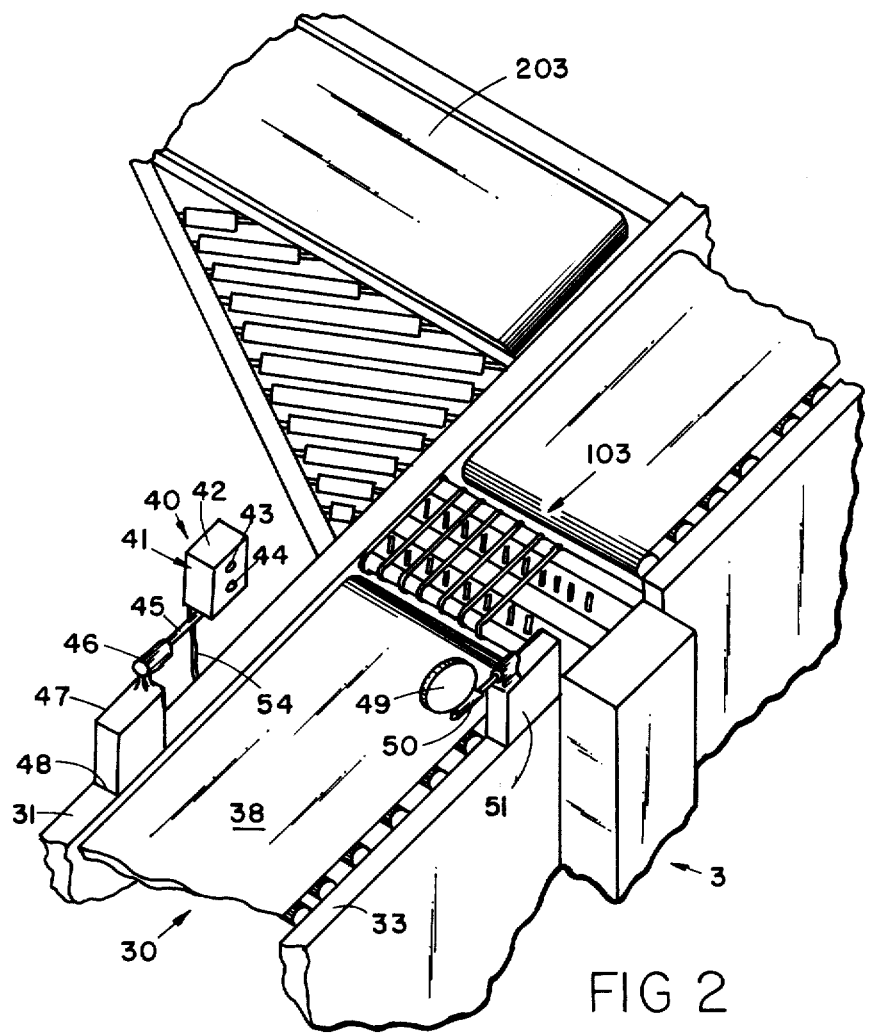
FIG. 2 is an enlarged fragmentary perspective view of one of the divert stations of the system shown in FIG. 1 showing installation of a portable training detector thereon.

Referring initially to FIG. 1, there is shown a conveyor sorting system 10 embodying the present invention. In the embodiment shown, three infeed conveyors 12, 14, and 16 communicate with an induction station 20 comprising induction conveyors 13, 15, and 17 coupling the infeed conveyors with a merging conveyor 22. Each of the induction lines 13, 15, and 17 include an article present detector 19 which is employed to control the induction lines for stopping the induction of an article until such time as an operator has coded into the control system by means of control panels 25 (one associated with each induction line) an article destination code identifying the divert location for a particular article. Once this is accomplished, the induction lines 13, 15, and 17 operate to transfer the articles onto the merging conveyor 22. An article trailing edge detector 21 is also associated with each of the induction lines and is employed to prevent subsequent induction of articles until such time as an article has cleared the induction line and is entering the merging conveyor 22.

The merging conveyor includes in the preferred embodiment, two induction detectors 24 and 26 which provide a predetermined reference location near the input end of the sorting conveyor indicating an article has left the induction stations, has been coded, and is proceeding along the sorting conveyor 30. The induction lines and merging conveyor can be of a construction substantially identical to that disclosed in U.S. Pat. No. 4,044,897, issued Aug. 30, 1977, to W. R. Maxted and assigned to the present assignee, the disclosure of which is specifically incorporated herein by reference.

Figure 5:
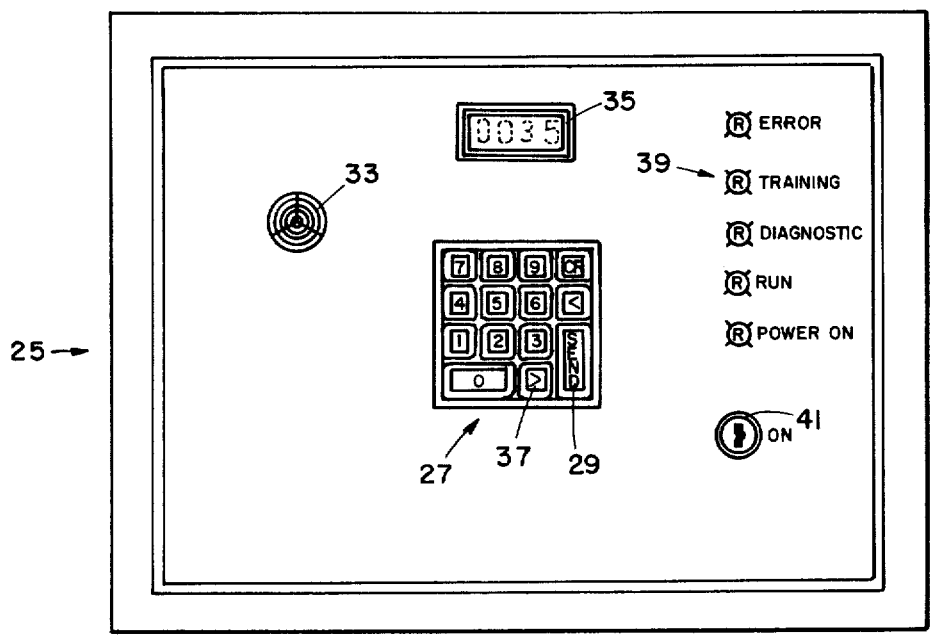
FIG. 5 is a front elevational view of an operator control panel employed with the control system of the present invention.

The function of the induction station 20, therefore, is to singulate articles and through the merging conveyor 22, feed articles from the three infeed conveyors onto the main sorting conveyor 30 which communicates with the exit end 28 of the merging conveyor 22. For this purpose the merging conveyor 22 includes a plurality of powered rollers 27 converging articles toward the center for transfer onto the main conveyor 30. The induction station also allows the operators by use of a keyboard 27 (FIG. 5) on control panel 25 positioned adjacent each of the induction lines to identify an article entering the induction line and code the destination information into the control system. Once this information is entered by the keyboard, the operator actuates a send key 29 to effect the automatic induction of the articles. The merging conveyor, in conjunction with the induction line and control system, assures the articles are properly spaced and their position is always known with respect to the fixed reference induction detectors 24 and 26.

The various detectors can comprise a variety of well known and commercially available detectors and in the preferred embodiment comprise a photo electric detector and light source positioned on one side of the conveyor lines and a reflective target positioned on the other side such that when an article passes between the target and the light source and detector, a signal is generated by the detector indicating the presence of an article at the location of the detector. Articles are then selectively diverted at a plurality of divert locations spaced longitudinally along conveyor 30 and identified in the preferred embodiment as divert locations 1, 2, 3, to n. A commercially available pulse position indicator (PPI) 36 is coupled to the drive mechanism of the main conveyor 30 which can be an endless loop belt 38 (FIG. 2) or, in some embodiments, a conventional roller conveyor. The pulse position indicator 36 provides an output pulse for each incremental distance of movement of the conveying element associated with conveyor 30 as, for example, one pulse for each inch of movement. The position of an article as it passes between the detectors 24 and 26, therefore, can be accurately determined if the pulses from PPI 36 are counted from the time the article leaves the induction detectors to the time the article interrupts a detector positioned at any one of the divert locations 1 through n.

Each of the divert locations 1 through n includes a diverting mechanism 101 through n+100 which are preferably of the type disclosed in U.S. Pat. No. 3,983,998, issued Oct. 5, 1976, to W. R. Maxted, et al, and assigned to the present assignee, the disclosure of such patent being specifically incorporated herein by reference. Each of the diverters are mounted within the main conveyor line 30 in a conventional manner. Each of the divert locations 1 through n also include a divert conveyor 201 through n+200 which receive articles from the diverters 101 through n+100 and discharge them to, for example, loading ramps for accumulating articles destined for a particular store for loading onto a transportation vehicle. Spaced at intermediate locations along the conveyor line 30 is a plurality of update detectors with detectors 32 and 34 being employed in the preferred embodiment. The purpose of the update detectors is to provide a check with respect to a predicted location of an article as it travels along the conveyor with its actual position and if the predicted and actual position vary significantly, the divert command is aborted so the article is not improperly diverted at the wrong divert location.

It can be appreciated that in order to divert articles at the fixed position divert locations, 1 through n, it is necessary to program the control system with information representing the distance the articles require to travel from the reference location such as the induction detectors 24 and 26 to each of the discharge locations. Once this information is accurately known and optimized for a variety of different articles having different sizes, shapes, and weights, the control system can employ such information together with the known starting point of an article at the induction detectors to effect the discharge of articles onto any one of the selected divert conveyors. The control system for effecting discharge of articles once this information has been ascertained can be substantially identical to that disclosed in the above identified U.S. Pat. No. 4,044,897. In order to provide this information directly from the conveyor system itself as opposed to the prior art techniques of measuring the distance and performing calculations to estimate the discharge location spacing from the reference location, a unique training detector and control system is employed and is now described in conjunction with FIGS. 2 through 5.

In order to provide the accurate travel information for articles from the predetermined reference location to each of the diverters, a portable training detector unit 40 (FIGS. 1, 2, and 3) is employed. In the preferred embodiment, as best seen in FIG. 2, the training detector unit comprises a photocell and light unit 41 comprising a housing 42 with a source of illumination 43 and a photo detector 44 mounted in spaced relationship to one another. Housing 42 is mounted on an arm 45 and to a mounting bracket 47 by means of an adjustable ball joint 46. Bracket 47 includes a magnetic base 48 such that the unit 41 can be movably and adjustably positioned anywhere along the rail 31 of the conveyor 30. In the preferred embodiment, as seen also in FIG. 1, the unit is positioned just forward (upstream) of divert location 3. Associated with the light and detector unit 41 is a retroreflective target 49 mounted to a mounting bracket 51 similar to bracket 47 by means of an adjustable arm 50 positioning the target on the rail 33 of conveyor 30 opposite rail 31. Electrical signals generated by the detector 40 and representing the detection of an article approaching the divert location are applied to an eight channel interrupt expander board 58 associated with the control system 60 (FIG. 3) by means of an electrical conductor 54. This conductor, as can be appreciated, is of significant length since the training detector is moved to each divert location along the conveyor line for obtaining article travel information for each of the divert locations and the control system 60 typically is centrally located.

Referring now to the control system 60 shown in FIG. 3, the heart of the system is a central processing unit 62 which comprises an integrated circuit microprocessor intercoupled with a plurality of interface circuits and memories. Thus, for example, associated with the CPU 62 is a programmable read only memory (PROM) 64 coupled thereto by a data link 63. Also coupled to the CPU 62 is a random access memory (RAM) 66 coupled to CPU 62 by means of data lines 65. Control panels 25 (FIGS. 1 and 5) are coupled to the CPU 62 by means of a serial interface board 68 and data lines 67 and 69 as shown in FIG. 3. A system clock 70 is employed for timing of the data flow in the system and is coupled to the CPU 62 by means of conductors 72. The system clock 70 also includes a power fail detector circuit and a control output conductor 73 coupled to a battery pack 74 for supplying temporary power to RAM 66 by means of power conductors 75. The use of the backup battery pack 74 prevents the loss of data temporarily stored in RAM 66 in the event of a temporary power loss. The divert control signals developed by the CPU are applied to output conductors 76 coupled to a 16 bit output board 78 which converts the digital command signals from the CPU 62 into control signals which are applied to the external controlled equipment such as the diverter actuators, control valves, and the conveyor and induction station motors.

Signals from PPI 36 are also applied to the CPU 62 through interface circuit 58 by means of conductor 39 and a data link 59 coupling board 58 to CPU 62. Similarly, the remaining detectors including update photocells 32, 34, and the article present trailing edge and induction detectors 19, 21, 24, and 26 shown in FIG. 3 as block 31 are coupled to the CPU through interface circuit 58 by means of data links 33.

Each of the circuit modules 58 through 78 are commercially available from PCS Corporation of Saline, Michigan, and their commercially available model number is identified in the below table.

| 58-PM5008 | 62-CM4400 | 64-CM4503 | 66-CM4501 |
|---|---|---|---|
| 68-PM5080 | 70-PM5013 | 74-PS3014 | 78-PM5005 |

These circuit boards are mounted in a cabinet by means of a rack mounting system also commercially available by the above identified manufacturer as Model No. 2292 MICROPACK basic B.

In the training mode of operation of the sorting conveyor system, a sample of all packages, cartons, or other articles, the system is designed to convey is released by the induction station and sent through the system with the training detector 40 being sequentially positioned ahead of each of the divert locations such that the number of pulses from the PPI 36 detected as an article passes between reference detectors 24 and 26 and the training detector can be counted. This information is then stored in the RAM memory 66 (FIG. 3) until the data recorded is employed in the operation of the system for a few days to assure its accuracy. Once its accuracy has been ascertained, the measured parameters are then burned into the PROM 64 for use in the operation of the system. If any system redesign is made such as a change in the length of the main conveyor 30, or movement of or change of numbers of the divert chutes, new data is determined in the training mode of operation to correct the parameter values.

The training mode of operation encompasses four submodes of operation, each of which are described below. The submodes include: (1) the measurement of the parameters; (2) the sequential entry of the parameter values into the RAM memory; (3) the confirming sequential display of the parameter values entered into the memory; and (4) correction of parameters as required. This sequence of operation is controlled by the CPU 62 by virtue of the control program in the PROM memory 64 (FIG. 3) which is attached hereto as appendix A and specifically incorporated herein by reference and attachment as part of the specification.

Figure 4:
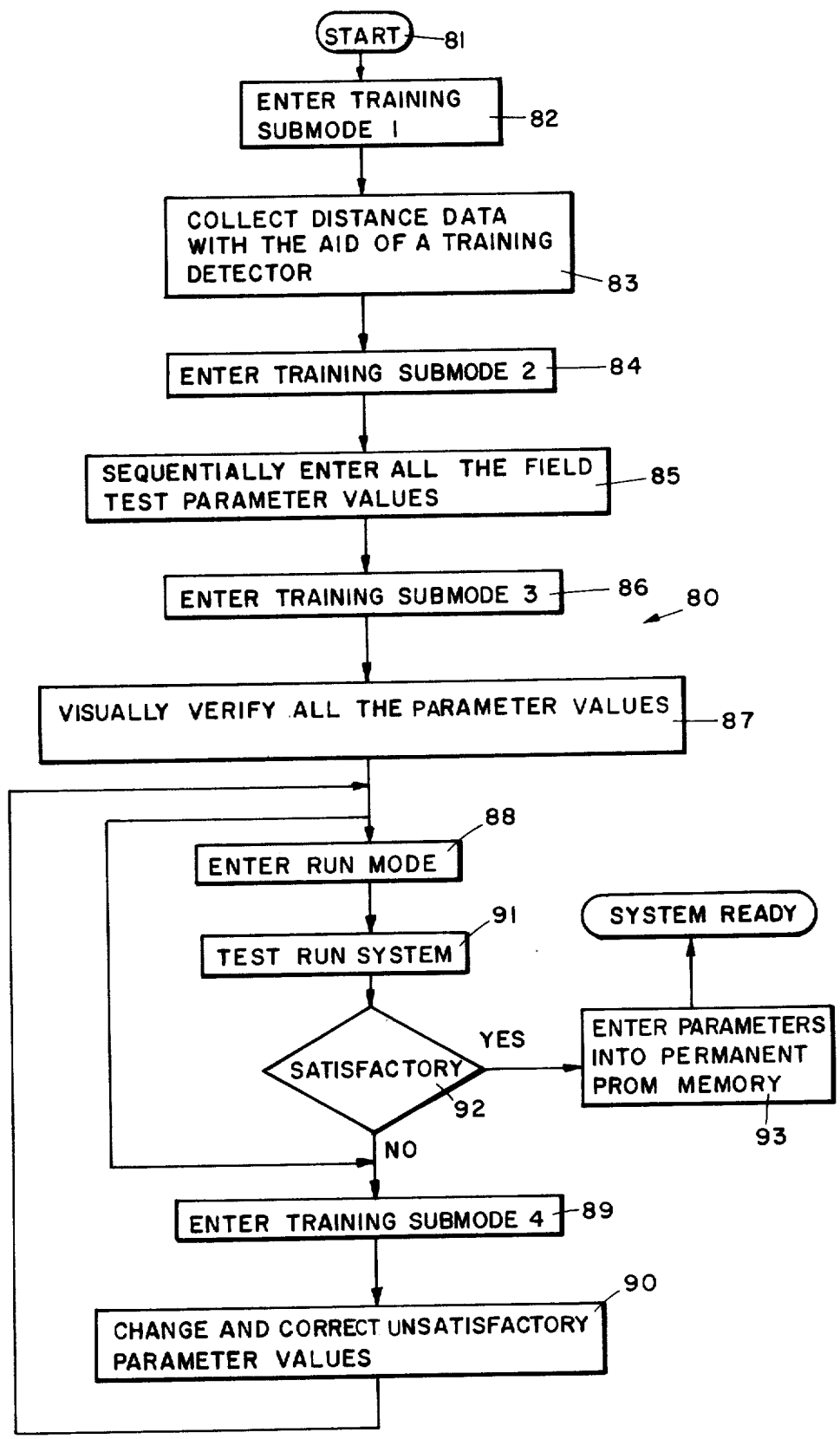
FIG. 4 is a flow diagram of the control processing operation of the control system according to the present invention.

In the flow diagram of FIG. 4, the logical sequence of the training mode programming which is initiated at the starting point shown as block 81. In order to enter the training mode once power is applied to the electrical control circuit, a training mode switch 71 (FIG. 3) is actuated and the CPU responds to place the unit in the training mode of operation. As seen in FIG. 4, submode 1 is the first mode of operation for the system. During this mode, the distance between various detectors and the system is measured in terms of the number of PPI pulses counted as articles travel between the successive detectors. In order to operate the system in this mode, the operator actuates keyboard 27 (FIG. 5) with a four digit code with the first two digits identifying the device code such as induction detector, blocking or clearing, or update photo blocking or clearing and the second two digits identifying the particular detector of such type. If a correct four digit code is entered, an acoustical beeper 33 (FIG. 3) is momentarily actuated to indicate to the operator the correct code has been entered. The code is also displayed by the four digit light-emitting-diode (LED) display 35 on the control panel 25. The control panel 25 in addition to the keyboard 27 and display 35 also includes additional display indicators 39 indicating to the operator which mode of operation the system is in as well as a key operated master on-off switch 41 which prevents inadvertent access by unauthorized personnel.

The operator then enters the starting point detector identification information by actuating the send key 29 and subsequently enters a second code identifying the training detector 40 and again actuates the send key. The induction station then automatically releases a package from the induction line and as the package clears the starting point and travels to the location of the training detector 40, the number of PPI pulses which occur between this interval is counted by a counter in the CPU 62 and such count displayed on display 35. When the article is detected by the training detector, if at a divert location, the diverter is actuated. If the article is diverted too early or too late for proper transfer to the divert conveyor, the portable training detector is moved downstream or upstream, respectively, to compensate for the error until proper diverting action is achieved. This naturally involves releasing several test articles. Alternatively, since the PPI pulses represent a predetermined distance, the operator can add or subtract counts to the displayed count if the distance error at the diverter is known.

Once the optimum location is determined for the range of article types used in the system, the operator manually records the displayed information. This procedure is repeated for each of the locations such as for each of the update photos as well as between each induction line and each of the divert locations employing the training detector 40 to identify each of the divert locations. Since the training detector is portable, it is easily moved from divert chute to divert chute allowing for the travel representative parameter to be displayed and recorded by the operator.

Once data sufficient to provide a representation of the size, shape, type, and weight of articles employed by the system has been run through the system and the distance parameter is determined, which function is indicated by block 83 in FIG. 4, the operator switches the system to the submode 2 operation indicated by block 84 in FIG. 4. This is accomplished by actuating key 37 of the keyboard 27 followed by the number 2 on the keyboard and again actuating key 37. At this time, the CPU 62 activates display 35 to sequentially display each of the parameter identification numbers previously entered by the operator. The operator then responds to the displayed parameter identification by entering the PPI count number determined in submode 1 of operation. This value is typed in as a four digit number employing keyboard 27. For example, parameter number 1002 corresponds to the slippage of the conveyor in the event of loss of power. Since the conveyor will continue to coast for a distance after the power has been lost, the number of PPI pulses which would have been detected is estimated (or measured) for the coasting distance and entered into the RAM memory by keyboard 27 in response to the display of the identification 1002. In operation, this number is employed to update the CPU counters in the event power is momentarily lost and the conveyor coasts to a stop. When power is reapplied, the location of articles on the conveyor is still known.

Likewise, the pulse count for each of the distances measured in submode 1 are entered as their identification number is displayed in sequence by display 35 on control panel 25. These parameter values are thus stored in RAM memory 66 by entry therein through interface circuit 68 and the CPU 62. The distance representative parameter values identify the distances between the detectors in the conveyor system such that during operation of the system once an article is detected at any given location in the system, its known position can be compared with the position it should be in and if they differ materially, the programmed divert can be aborted for that article.

Once the operator has in training submode 2 entered the data (as indicated by block 85 in FIG. 4) which has been recorded as a result of the submode 1 tests, the entry of the parameter value is verified in the submode 3 operation (blocks 86 and 87). The training submode 3 is entered by the operator actuating key 37 of keyboard 27, the numeral 3, and again actuating key 37. The parameter identification numbers are sequentially displayed for two seconds followed by its value. In order to sequence to the next parameter, the operator actuates the send key 29 and the successive parameter identification and subsequently its value is displayed. The operator thus, in the submode 3, verifies entry of the parameter values into RAM 66 of the control system. In the event that any of the parameter values are incorrect, the operator can make a note of the incorrect parameter and its correct value entered in the submode 4 operation described below.

If the parameter values displayed to the operator are correct (i.e., correspond to the values entered by the operator) the operator can enter the run mode 88 of operation of the system directly by actuating switch 71 (FIG. 3) to automatically place the system in the run mode of operation. If, however, one or more of the parameter values entered is incorrect, they can be corrected by the operator by directly entering training submode 4 indicated as block 89 in FIG. 4 automatically by actuating the send key 29 after the last parameter value has been displayed in submode 3.

In submode 4, the operator enters the specific parameter number which is desired to be changed and actuates the send key. In order to change the parameter, the operator then types in the correct parameter value through keyboard 27 and actuates send key 29 which is acknowledged by an acoustical beep from unit 33. Similarly, the operator can type in the parameter identification for the remaining parameters to be changed and repeat the process until all the parameters required to be changed have been changed as indicated by block 90 in FIG. 4.

By actuating switch 71 (FIG. 3) the system then enters the run mode 88 and articles can be inducted for sortation in the normal run mode of operation. This is achieved by operators at the operator consoles 25 (FIG. 1) typing in the divert code identification from a label applied to the article and actuating send key 29 to automatically induct and divert articles on the conveyor system 10. Since each divert location has an identification code stored in memory, and the PPI count to each divert location is known, the operator need only enter the divert location's identifying code to achieve the diverting of articles as set forth in the above U.S. Pat. No. 4,044,897.

The test run may extend for a period of several days' until the system is commissioned and deemed satisfactory as indicated by the logic block 92. If further corrections are necessary, the submode 4 (block 89) is again entered and corrections as required are made. If the parameter values entered into RAM 66 are satisfactory for the system in the run mode of testing, these values can be burned in the PROM memory 64 as indicated by block 93 and the system is then ready for operation. In order to burn the information into PROM, a commercially available PROM programmer is employed and the parameter identification is keyed into a keyboard included in such unit followed by the parameter value which has been displayed in submode 3 of the training mode. Naturally, RAM memory 66 continues to serve as temporary storage for the normal data handling in the microprocessor control circuit but the parameter values are now permanently stored in PROM for subsequent use by the microprocessor in controlling the diverting of articles.

As understood by those skilled in the art, the particular programming will depend upon the individual programming the system and any number of data handling variations are possible to achieve the desired training mode of operation forming the present invention. Likewise, the actual operation of the conveyor system in the run mode is achieved by conventional programming using the data determined in the training submode.

Similarly, as can be appreciated by those skilled in the art, the conveyor induction system can be modified for example, to employ side induction at different locations along the conveyor line 30 as opposed to an end induction system as shown by the preferred embodiment of FIG. 1. A fewer or a greater number of infeed conveyors and induction lines also can conveniently be incorporated into the system of the present invention. These and other variations to the preferred embodiment described and disclosed herein can be made by those skilled in the art without departing from the spirit or scope of the invention as defined by the appended claims.

The embodiments of the invention in which an exclusive property or privilege is claimed are defined as follows:

1. In a sorting conveyor system for articles, said system including a control circuit providing signals to diverter mechanisms in response to comparison of signals representing the distance the articles travel from a reference location to a selected divert location and operator assigned divert location information, the improvement comprising a training system for providing reference signals representing the distance articles travel from a reference location near an entry point of articles on the conveyor to each divert location, said training system comprising:

a source of signals representative of conveyor movement;

a first detector positioned near an entry point of articles onto the sorting conveyor;

a second detector movably positionable along the conveyor; and electrical circuit means coupled to said source and said first and second detectors for storing signals from said source representative of the distance an article travels between said first and second detectors for different locations of said second detector thus providing stored reference information which can subsequently be employed by the control circuit to control the diverting of articles based upon said stored information.

2. The system as defined in claim 1 wherein said electrical circuit means includes a CPU and interface circuit means coupling said CPU to said first and second detectors, said electrical circuit means further including memory means coupled to said CPU for storing distance representative signals from said source.

3. The system as defined in claim 2 wherein said source of signals comprises a pulse generator.

4. The system as defined in claim 3 and further including an operator console having a digital keyboard and display coupled to said CPU for entering and monitoring data into said memory means.

5. The system as defined in claim 4 wherein said second detector comprises a light source and photo detector mounted to a portable base of adjustably positioning said second detector along the conveyor.

6. The system as defined in claim 5 wherein said portable base is magnetic for attachment directly to the conveyor support structure.

7. A conveyor sorting system comprising:
at least one infeed conveyor;
a sorting conveyor including a plurality of divert locations spaced therealong each divert location including actuatable divert means for diverting articles from said sorting conveyor to a selected divert conveyor;
an induction station coupling said at least one infeed conveyor to said sorting conveyor; and
an operator actuated control system for controlling said divert means to sort articles according to an assigned divert location wherein said control system includes means for generating signals representing the distance actually traveled by articles between a predetermined reference location and each divert location for accurately diverting articles at each divert location and means for storing such travel information and for correlating said stored travel information with an assigned divert location for an article to effect the discharge of articles from said sorting conveyor to divert conveyors at selected divert locations.

8. A conveyor sorting system comprising:
at least one infeed conveyor;
a sorting conveyor including a plurality of divert locations spaced therealong, each divert location including actuatable divert means for diverting articles from said sorting conveyor to a selected divert conveyor;
an induction station coupling said at least one infeed conveyor to said sorting conveyor; and
an operator actuated control system for controlling said divert means to sort articles according to an assigned divert location wherein said control system includes means for generating information pertaining to the travel of articles between a predetermined reference location and each divert location and means for storing such travel information and for correlating said stored travel information with an assigned divert location for an article to effect the discharge of articles from said sorting conveyor to divert conveyors at selected divert locations, wherein said generating means comprises a training detector which is movable to each divert location along the conveyor, a reference detector fixedly positioned at the predetermined reference location and a pulse generator providing pulses representative of conveyor movement.

9. The system as defined in claim 8 wherein said control system includes a CPU and interface circuit means coupling said CPU to said reference detector, to said training detector and to said pulse generator, said control system further including memory means coupled to said CPU for storing signals from said pulse generating means representative of the distance between said reference detector and each divert location.

10. The system as defined in claim 9 wherein said memory means includes a PROM.

11. The system as defined in claim 10 wherein said memory means further includes a RAM.

12. The system as defined in claim 11 and further including an operator console having a digital keyboard and display coupled to said CPU for entering and monitoring data into said RAM.

13. The system as defined in claim 12 wherein said training detector includes a portable base for movably positioning said training detector along said conveyor.

14. The system as defined in claim 13 wherein said portable base is magnetic for attachment directly onto the conveyor support structure.

15. The system as defined in claim 14 wherein said training detector includes a light source and photo detector for detecting objects passing into a light path therebetween.

16. A method of determining and storing parameter values in a programmable control system for a sorting conveyor in which a reference detector is positioned near the conveyor input and a portable training detector is movably positionable at the divert locations of the conveyor, and wherein the control system includes a signal generator providing signals representing conveyor movement, said control system further including data entry and display means, said method comprising the steps of:
positioning said training detector near each divert location to effect diverting of articles in response to the detection of said articles by said training detector;
detecting signals from said signal generator for each divert location;
entering the detected signals into the programmable control system;
verifying the detected signals for each divert location; and
correcting detected signals for divert locations where the detected and entered information does not effect proper diverting of articles at such divert locations.

17. The method as defined in claim 16 wherein said detecting step includes the steps of displaying signals representing the distance an article travels between the reference detector and the training detector for each divert location and recording the displayed signals.

18. The method as defined in claim 17 wherein the entering step comprises transferring the recorded signals into the programmable control system.

19. The method as defined in claim 18 wherein the verifying step comprises the steps of sequentially displaying a parameter identification followed by a display of the corresponding parameter value for each of the distance representative signals of the system.

20. The method as defined in claim 19 wherein the correcting step comprises entering the parameter identification followed by entry of the correct parameter value.

21. The system as defined in claim 7 wherein said generating means comprises a training detector which is movable to each divert location along the conveyor, a reference detector fixedly positioned at the predetermined reference location and a pulse generator providing pulses representative of conveyor movement.

22. The system as defined in claim 21 wherein said control system includes a CPU and interface circuit means coupling said CPU to said reference detector, to said training detector and to said pulse generator, said control system further including memory means coupled to said CPU for storing signals from said pulse generating means representative of the distance between said reference detector and each divert location.

23. The system as defined in claim 22 wherein said memory means includes a PROM.

24. The system as defined in claim 23 wherein said memory means further includes a RAM.

25. The system as defined in claim 24 and further including an operator console having a digital keyboard and display coupled to said CPU for entering and monitoring data into said RAM.

26. The system as defined in claim 25 wherein said training detector includes a portable base for movably positioning said training detector along said conveyor.

27. The system as defined in claim 26 wherein said portable base is magnetic for attachment directly onto the conveyor support structure.

28. The system as defined in claim 27 wherein said training detector includes a light source and photo detector for detecting objects passing into a light path therebetween.

* * * * *